United States Patent
Grabar et al.

(10) Patent No.: US 9,463,705 B2
(45) Date of Patent: Oct. 11, 2016

(54) SYSTEM AND METHOD FOR ADAPTIVE CHARGING COMPLIANCE CONTROL

(71) Applicant: QUALCOMM Incorporated, San Diego, CA (US)

(72) Inventors: Simon Grabar, Munich (DE); Michael Werner, Markt Schwaben (DE); Leandro Alberto Percebon, Munich (DE)

(73) Assignee: QUALCOMM INCORPORATED, San Diego, CA (US)

( * ) Notice: Subject to any disclaimer, the term of this patent is extended or adjusted under 35 U.S.C. 154(b) by 241 days.

(21) Appl. No.: 14/301,085

(22) Filed: Jun. 10, 2014

(65) Prior Publication Data
US 2015/0352963 A1 Dec. 10, 2015

(51) Int. Cl.
*B60L 11/18* (2006.01)
*H02J 17/00* (2006.01)

(52) U.S. Cl.
CPC ............. *B60L 11/182* (2013.01); *H02J 17/00* (2013.01); *H02J 50/80* (2016.02); *H02J 50/90* (2016.02); *B60L 11/1825* (2013.01); *H02J 50/12* (2016.02)

(58) Field of Classification Search
CPC ... B60L 11/182; B60L 11/1825; H02J 17/00; H02J 50/12; H02J 50/80; H02J 50/90
See application file for complete search history.

(56) References Cited

U.S. PATENT DOCUMENTS

| 9,296,302 B2 * | 3/2016 | Birke ................. B60L 11/1809 |
| 2003/0167139 A1 * | 9/2003 | Swartz ................. G01R 31/007 702/65 |
| 2012/0153894 A1 | 6/2012 | Widmer |
| 2012/0242288 A1 * | 9/2012 | Birke ................. B60L 11/1809 320/109 |
| 2013/0029595 A1 | 1/2013 | Widmer et al. |
| 2013/0103191 A1 | 4/2013 | Bouman |
| 2013/0124320 A1 | 5/2013 | Karner |
| 2013/0127417 A1 | 5/2013 | Karner et al. |

FOREIGN PATENT DOCUMENTS

WO WO-2013063306 A1 5/2013

OTHER PUBLICATIONS

International Search Report and Written Opinion—PCT/US2015/029709—ISA/EPO—Aug. 21, 2015.

* cited by examiner

*Primary Examiner* — Naum B Levin
(74) *Attorney, Agent, or Firm* — Knobbe, Martens, Olson & Bear, LLP (57) ABSTRACT

Apparatus, system, and method for adaptive charging compliance control are disclosed. A charging station wirelessly charges a vehicle in compliance with emissions regulations. A controller in the charging station obtains information regarding the characteristics of an incoming vehicle and accesses a maximum regulation-compliant power level database based on the vehicle information obtained and determines conditions of the vehicle parked at the charging station. The controller determines and delivers the maximum power level to wirelessly charge the vehicle while maintaining the level of field emissions no greater than the regulatory limit.

22 Claims, 9 Drawing Sheets

SYSTEM AND METHOD FOR ADAPTIVE CHARGING COMPLIANCE CONTROL

FIELD

The described technology generally relates to wireless power for charging or powering devices or vehicles, and specifically to system and method for adaptively performing wireless power transfer to comply with regulations.

BACKGROUND

Effective wireless power transfer from a transferring system may depend on the characteristic of the receiving system and various charging conditions. Furthermore, regulation compliance may restrict performance of wireless power transfer. Therefore, there is a need for a transferring system to adapt to receiving system characteristics and charging conditions while keeping the wireless power transfer regulation complaint.

SUMMARY

An apparatus for transmitting charging power wirelessly to a receiver via a wireless charging field is provided. The wireless charging field generates field emissions. The receiver has a receiver antenna and is operationally connected to a load of a vehicle. The apparatus comprises a power transmitter having a transmitter antenna. The apparatus further comprises a sensor circuit configured to determine one or more charging conditions associated with the receiver. The apparatus further comprises a controller operationally coupled to the sensor circuit. The controller is configured to obtain a first indicator of one or more characteristics of the vehicle. The controller is further configured to determine a second indicator of the one or more charging conditions. The controller is further configured to determine a power level for driving the transmitter antenna at a level sufficient to maintain the field emissions from the wireless charging field below an emission threshold level. The power level is determined based on the first and second indicators.

A method for transmitting charging power wirelessly to a receiver via a wireless charging field is also provided. The wireless charging field generates field emissions. The receiver has a receiver antenna and is operationally connected to a load of a vehicle. The method comprises determining one or more charging conditions associated with the receiver. The method further comprises obtaining a first indicator of one or more characteristics of the vehicle. The method further comprises determining a second indicator of the one or more charging conditions. The method further comprises determining a power level for driving the transmitter antenna at a level sufficient to maintain the field emissions from the wireless charging field below an emission threshold level. The power level is determined based on the first and second indicators.

An apparatus for transmitting charging power wirelessly to a receiver via a wireless charging field is also provided. The wireless charging field generates field emissions. The receiver has a receiver antenna and is operationally connected to a load of a vehicle. The apparatus comprises first means for determining one or more charging conditions associated with the receiver. The apparatus further comprises means for obtaining a first indicator of one or more characteristics of the vehicle. The apparatus further comprises second means for determining a second indicator of the one or more charging conditions. The apparatus further comprises third means for determining a power level for driving the transmitter antenna at a level sufficient to maintain the field emissions from the wireless charging field below an emission threshold level. The power level is determined based on the first and second indicators. The apparatus further comprises means for driving the power transmitter to wirelessly charge the receiver according to the power level.

A non-transitory computer-readable medium storing instructions that, when executed causes at least one physical computer processor to perform a method for transmitting charging power wirelessly to a receiver via a wireless charging field is also provided. The wireless charging field generates field emissions. The receiver has a receiver antenna and is operationally connected to a load of a vehicle. The method further comprises determining one or more charging conditions associated with the receiver. The method further comprises obtaining a first indicator of one or more characteristics of the vehicle. The method further comprises determining a second indicator of the one or more charging conditions. The method further comprises determining a power level for driving the transmitter antenna at a level sufficient to maintain the field emissions from the wireless charging field below an emission threshold level. The power level is determined based on the first and second indicators.

DETAILED DESCRIPTION

The detailed description set forth below in connection with the appended drawings is intended as a description of certain implementations and is not intended to represent the only implementations in which the disclosed techniques may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

Figure 1:
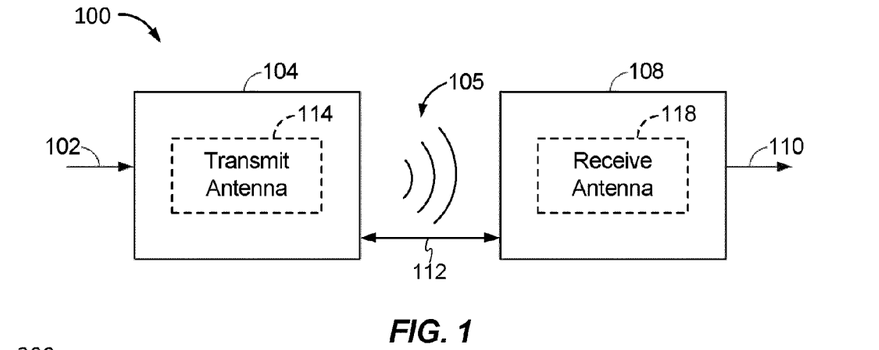
FIG. 1 is a functional block diagram of a wireless power transfer system, in accordance with one exemplary implementation.

FIG. 1 is a functional block diagram of a wireless power transfer system 100, in accordance with one exemplary implementation. An input power 102 may be provided to a transmitter 104 from a power source (not shown) to generate a wireless (e.g., magnetic or electromagnetic) field 105 for performing energy transfer. A receiver 108 may couple to the wireless field 105 and generate an output power 110 for storing or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling mode region.

Figure 2:
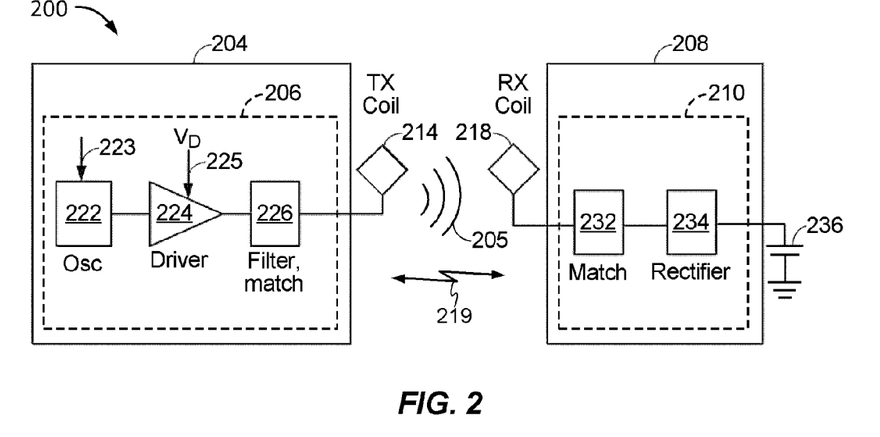
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of an electric vehicle, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
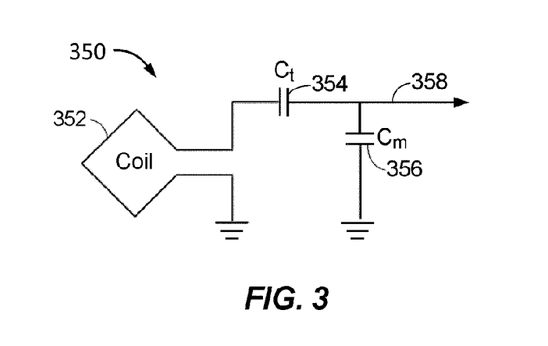
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled mode region of the transmit antenna 214 may be more powerful.

As stated, efficient transfer of energy between the transmitter 104/204 and the receiver 108/208 may occur during matched or nearly matched resonance between the transmitter 104/204 and the receiver 108/208. However, even when resonance between the transmitter 104/204 and receiver 108/208 are not matched, energy may be transferred, although the efficiency may be affected. For example, the efficiency may be less when resonance is not matched. Transfer of energy occurs by coupling energy from the wireless field 105/205 of the transmit coil 114/214 to the receive coil 118/218, residing in the vicinity of the wireless field 105/205, rather than propagating the energy from the transmit coil 114/214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

Referring to FIGS. 1 and 2, the transmitter 104/204 may output a time varying magnetic (or electromagnetic) field with a frequency corresponding to the resonant frequency of the transmit coil 114/214. When the receiver 108/208 is within the wireless field 105/205, the time varying magnetic (or electromagnetic) field may induce a current in the receive coil 118/218. As described above, if the receive coil 118/218 is configured to resonate at the frequency of the transmit coil 114/214, energy may be efficiently transferred. The AC signal induced in the receive coil 118/218 may be rectified as described above to produce a DC signal that may be provided to charge or to power a load.

Figure 4A:
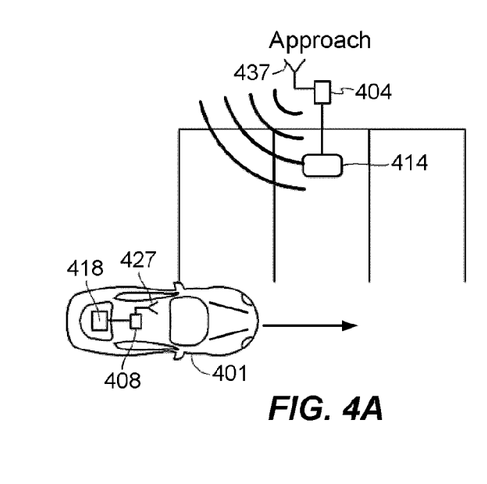
FIGS. 4A-4E are depictions of an alignment operation of electric vehicle and a wireless power transfer system, in accordance with an exemplary implementation.
Figure 4B:
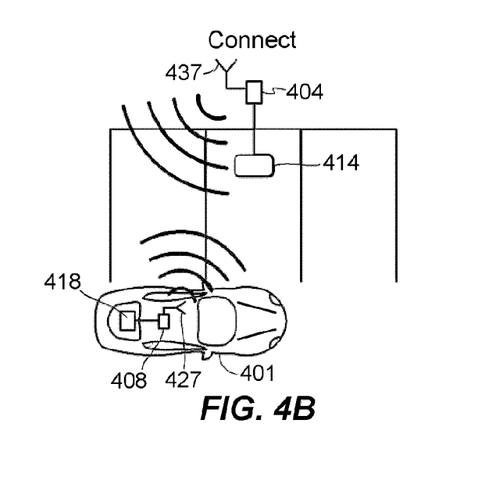
Figure 4C:
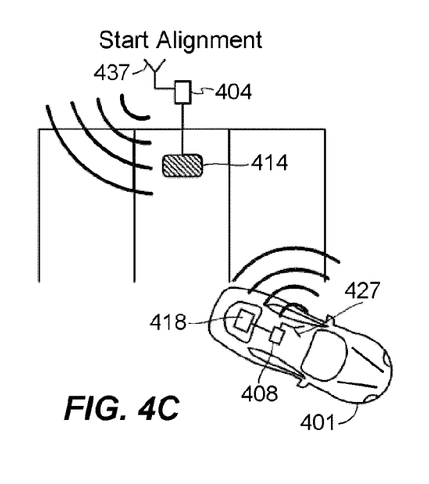
Figure 4D:
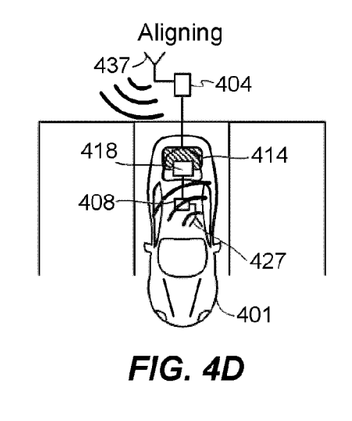
Figure 4E:
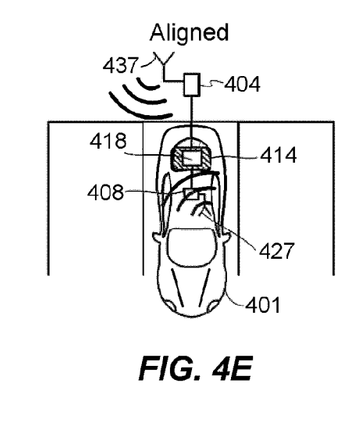

FIGS. 4A, 4B, 4C, 4D, and 4E are depictions of an alignment operation between an electric vehicle and a wireless power transfer system, in accordance with an exemplary implementation. FIG. 4A shows an electric vehicle 401 including a wireless power transfer and communication receiver 408 electrically connected to a receive antenna or coil 418 and a communications antenna 427. FIG. 4A also shows a wireless power transfer and communication transmitter 404 electrically connected to a transmit antenna or coil 414 and a communications antenna 437. The communications antenna 427 may be different from the receive coil 418. The communications antenna 437 may be different from the transmit coil 414. The communications antennas 427 and 437 may be configured to facilitate communication between the receiver 408 and the transmitter 404, respectively, as the vehicle 401 approaches. FIG. 4B shows the receiver 408 onboard the vehicle 401 establishing communication with the transmitter 404. In FIG. 4C, an alignment procedure may begin as the vehicle 401 moves towards the transmit coil 414. The communications link provides visual feedback, auditory feedback, or combinations thereof to a driver of the vehicle 401. The driver may use this feedback to determine when the vehicle 401 is properly positioned for wireless power transfer. In FIG. 4D, the alignment procedure continues as the vehicle 401 finalizes alignment by positioning the vehicle 401 such that the receive coil 418 mounted to the vehicle 401 is substantially aligned with the transmit coil 414. Finally, FIG. 4E shows the vehicle 401 positioned such that the receive coil 418 is substantially aligned with the transmit coil 414 of the transmitter 404.

Figure 5:
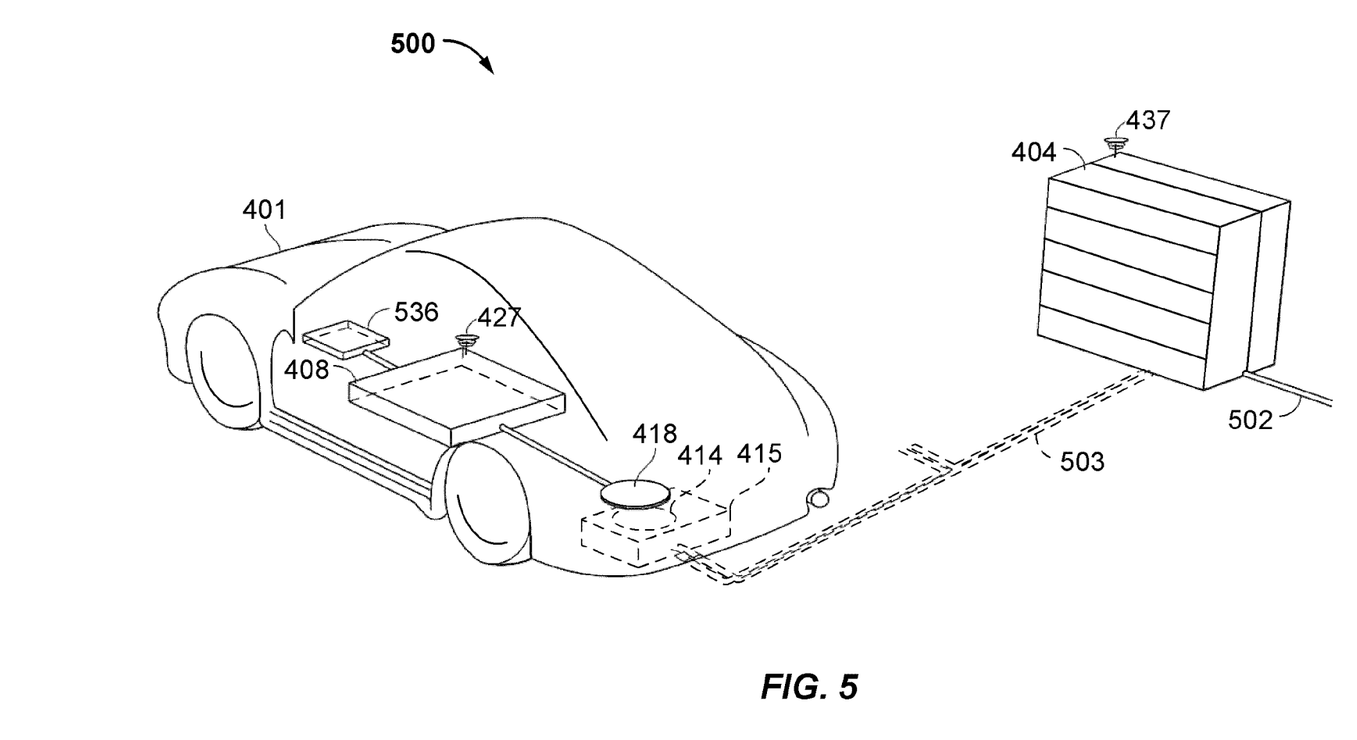
FIG. 5 is a diagram of a vehicle aligned over a transmitter coil, in accordance with an exemplary implementation.

FIG. 5 is a diagram of a vehicle aligned over a transmitter coil, in accordance with an exemplary implementation. The wireless power transfer system 500 enables charging of the vehicle 401 while the vehicle 401 is parked near the transmitter 404. Space is shown for the vehicle 401 to be parked over the transmit coil 414. The transmit coil 414 may be located within a base pad 415. In some implementations, the transmitter 404 may be connected to a power backbone 502. The transmitter 404 may be configured to provide an alternating current (AC), through an electrical connection 503, to the transmit coil 414 located within the base pad 415. As described in connection with FIG. 4 above, the vehicle 401 may include a battery 536, the receive coil 418, and the communications antenna 427 each connected to the receiver 408.

In some implementations, the receive coil 418 may receive power when the receive coil 418 is located in a wireless (e.g., magnetic or electromagnetic) field produced by the transmit coil 414. The wireless field corresponds to a region where energy output by the transmit coil 414 may be captured by the receive coil 418. In some cases, the wireless field may correspond to the "near field" of the transmit coil 414.

It is desirable that the transmit antenna or coil 414 provides wireless power level appropriate given the type of the vehicle 401, and charging conditions to comply with emissions regulations. Power level determination is further described in connection with FIGS. 6-8 below.

Figure 6:
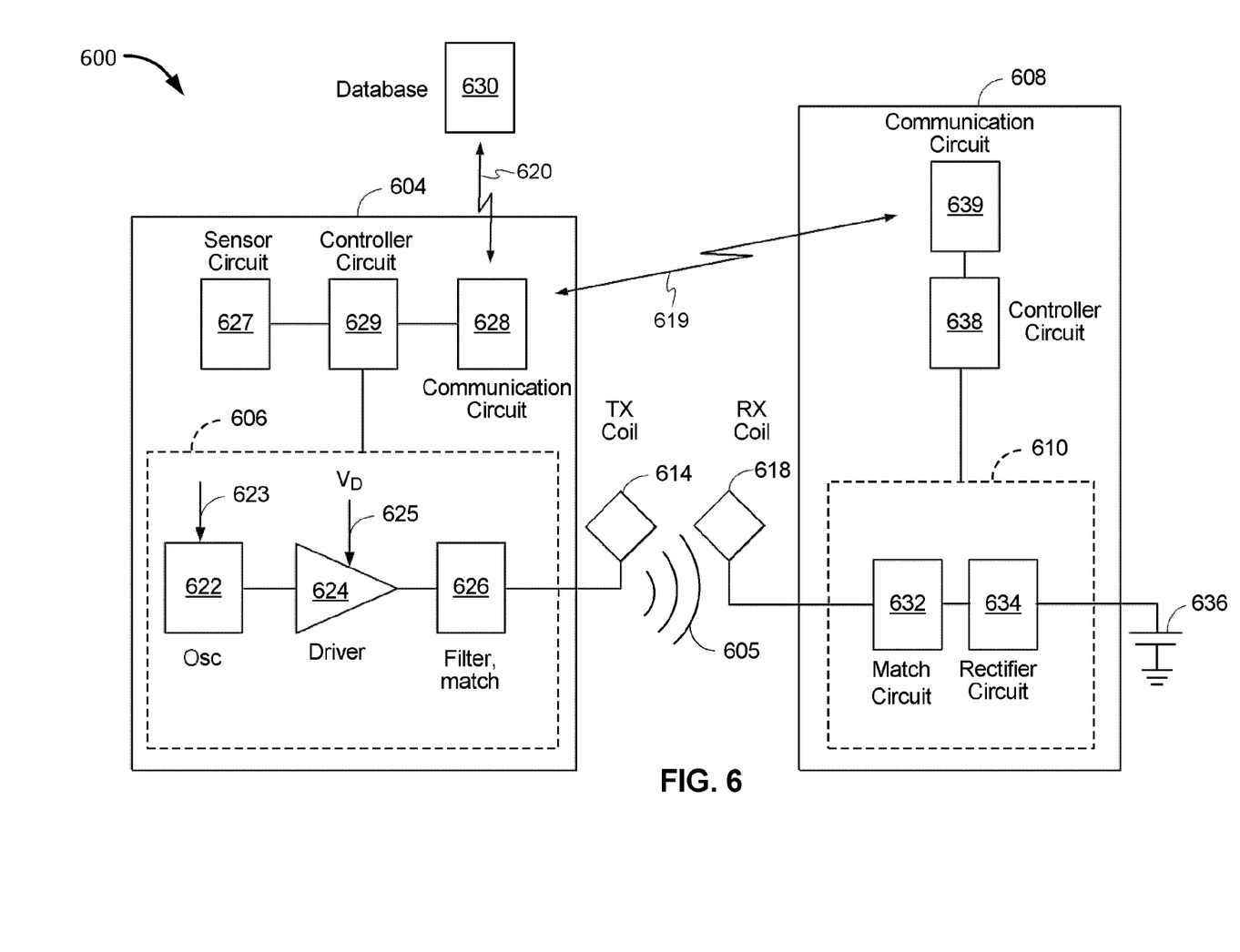
FIG. 6 is a functional block diagram of a wireless power transfer system having adaptive compliance control.

FIG. 6 is a functional block diagram of a wireless power transfer system 600 having adaptive charging compliance control. The system 600 includes a transmitter 604 with a transmit circuitry 606 and a receiver 608 with a receive circuitry 610. The transmitter 604 may include a sensor circuit 627 and a communication circuit 628 electrically connected to a controller circuit 629. The transmit circuitry 606 may include an oscillator 622, a driver circuit 624, and a filter and matching circuit 626. The oscillator 622 may be configured to generate a signal at a desired frequency that may be adjusted in response to a frequency control signal 623. The oscillator 622 may provide an oscillator signal to the driver circuit 624. The driver circuit 624 may be configured to drive the transmit antenna 614 at, for example, a resonant frequency of the transmit antenna 614 based on the oscillator signal and an input voltage signal ($V_D$) 625. In one non-limiting example, the driver circuit 624 may be a switching amplifier configured to receive a square wave from the oscillator 622 and output a sine wave.

The filter and matching circuit 626 may filter out harmonics or other unwanted frequencies and match the impedance of the transmitter 604 to the transmit antenna 614. As a result of driving the transmit antenna 614, the transmit antenna 614 may generate a wireless field 605 to wirelessly output power at a level sufficient for charging a battery 636 of an electric vehicle, for example. Unless stated otherwise, each component within the transmit circuitry 606 may have substantially the same functionality as the respective component within the transmit circuitry 206 as previously described in connection with FIG. 2.

The transmitter 604 may further include the sensor circuit 627 electrically connected to the controller circuit 629. The sensor circuit 627 may be configured to measure various charging conditions. Such charging conditions may include, for example, the extent of misalignment between the transmitter antenna 614 and the receiver antenna 618, if any, environmental variables, such as temperature and pressure, and presence or absence of surrounding infrastructure, such as nearby charging systems. The sensor circuit 627, for example, may include proximity sensors to determine the extent of misalignment between the transmitter antenna 614 and the receiver antenna 618. In other implementations, the sensor circuit 627 may include one or more sense coils configured to detect misalignment based on a magnetic field. Once the sensor circuit 627 obtains charging conditions information, the sensor circuit may communicate the information to the controller circuit 629. In another implementation, a sensor circuit (not shown) performing substantially similar functions as the sensor circuit 627 may reside in the receiver 608 or the vehicle 401 (FIG. 5) to which the receiver 618 is mounted.

The transmitter 604 may further include the communication circuit 628 electrically connected to the controller circuit 629. The communication circuit 628 may be configured to communicate with a communication circuit 639 within the receiver 608 over a communications link 619. Through the communications link 619, the communication circuit 628, for example, may obtain information specific to the vehicle with which the receiver 608 is associated. The communication circuit 628 may be configured to further communicate with a database 630 over a communications link 620. The communication circuit 628 may access the database 630 for charging profiles specific to the vehicle based on vehicle-specific information it may obtain through the communications link 619. The database 630 may include a lookup table of charging profiles for different types of vehicles in accordance with emissions regulations. As described in detail in connection with FIGS. 8A, 8B, and 10, the database 630 may be based on pre-determined models for determining maximum regulation-complaint power levels for various vehicle-specific parameters, including physical and electrical information of the vehicle, such as the make, year, size, shape, height, location of the receiver, and battery type. In one implementation all or part of the database 630 may reside in the transmitter 604. In another implementation the database 630 may be remotely accessed by the communication circuit 628.

The controller circuit 629 may receive the above described information from the sensor circuit 627 and the communication circuit 628 and may control the operation of the transmit circuit 606 accordingly. The controller circuit 629 may be configured to control the control signal 623, the input voltage signal 625, or both so that the maximum regulation-compliant power level is transferred from the transmitter 606 to the receiver 608.

The receiver 608 may include a receive antenna 618 and a receive circuitry 610. The receive circuitry 610 may include a match circuit 632 and a rectifier circuit 634. The receive antenna 618 may be electrically connected to the match circuit 632. The match circuit 632 may be electrically connected to the rectifier circuit 634. The rectifier circuit 634 may provide a DC current to a battery 636. Unless stated otherwise, each component within the receive circuitry 610 may have substantially the same or substantially similar functionality as the respective component within the receive circuitry 210 as previously described in connection with FIG. 2.

The receiver 608 may further include a controller circuit 638 electrically connected to a communication circuit 639. The controller circuit 638 may be configured to control the operation of the receive circuitry 610. The communication circuit 639 may be configured to communicate with the communication circuit 628 within the transmitter 604 over the communications link 619.

To provide power from the transmitter 604 to the receiver 608, energy may be transmitted from the transmit antenna 614 to the receive antenna 618 through a wireless field (e.g., a magnetic or electromagnetic field) 605. The transmit antenna 614 and the transmit circuitry 606 form a resonant circuit having a particular resonant frequency. The receive antenna 618 and the receive circuitry 610 form another resonant circuit having a particular resonant frequency. Because electromagnetic losses are minimized between two coupled resonant systems having the same resonant frequency, it is desirable for the resonant frequency associated with the receive antenna 618 to be substantially the same as the frequency associated with the transmit antenna 614.

At a given level of power transfer from the transmit antenna 614 and the receive antenna 618, magnetic field emissions from the charged vehicle may differ depending on the type of the vehicle and its current charging conditions. The determination of the regulation-compliant power level for a given vehicle and charging conditions is further described in connection with FIGS. 7A-10 below.

Figure 7A:
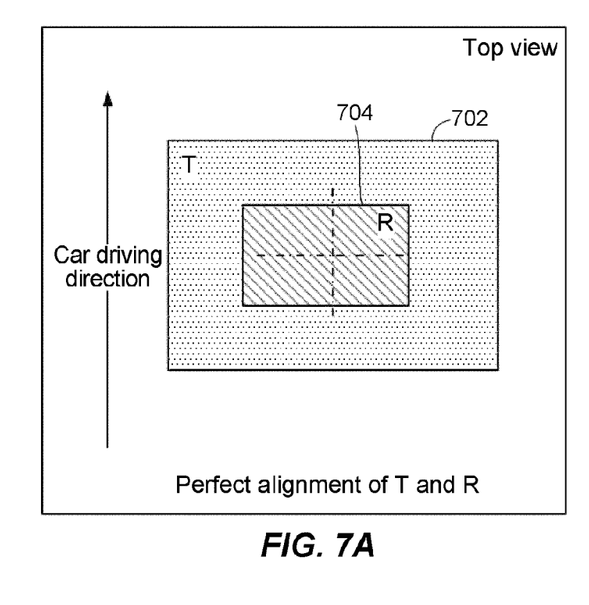
FIG. 7A is an exemplary illustration of vehicle alignment measurement according to one implementation.

FIG. 7A is an exemplary illustration of vehicle alignment measurement according to one implementation. The illustration depicts a top view of a case in which a receiver pad 704 is perfectly aligned with a transmitter pad 702. The transmitter pad 702 is substantially similar to the transmitter coil 414 of a base pad 415 of FIG. 5 and the receiver pad 704 is substantially similar to the receiver coil 418 mounted to the vehicle 401 of FIG. 5. The vehicle to be charged drives in the upward direction into the charging station that incorporates the transmitter pad 702 in its base. In the illustrated implementation, the exemplary point of alignment for each of the transmitter pad 702 and the receiver pad 704 is at the center. Therefore, as the vehicle drives in the upward direction and the center points of the transmitter pad 702 and the receiver pad 704 overlap, the transmitter pad 702 and receiver pad 704 are aligned.

Figure 7B:
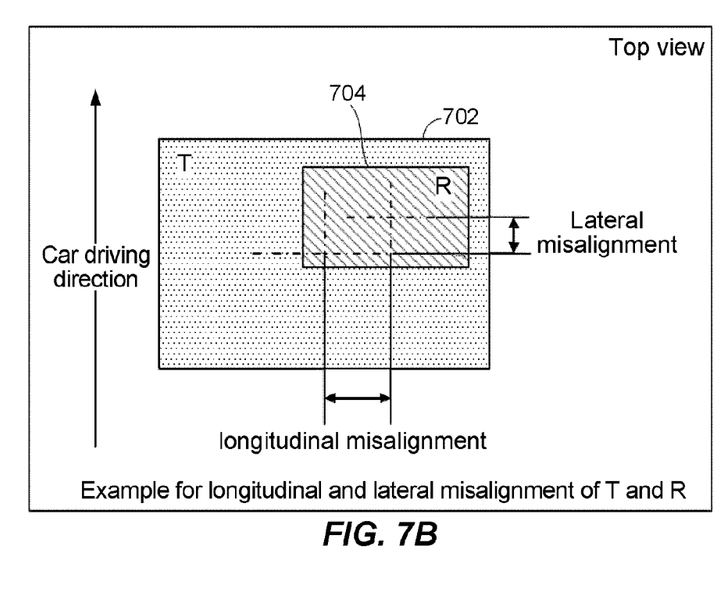
FIG. 7B is an exemplary illustration of vehicle misalignment measurement according to one implementation.

FIG. 7B is an exemplary illustration of vehicle misalignment measurement according to one implementation. The exemplary illustration is a top view of a case in which the receiver pad 704 is misaligned with respect to the transmitter pad 702. Similar to the illustration in FIG. 7A, the vehicle to be charged drives in the upward direction into the charging station, but the center points of alignment of the transmitter pad 702 and the receiver pad 704 do not perfectly overlap. The controller circuit 629 (FIG. 6), for example, may calculate longitudinal and lateral misalignment values by determining the difference between the center points of the transmitter pad 702 and the receiver pad 704 in a Cartesian coordinate. The longitudinal and lateral misalignment values in combination with a vertical gap value discussed in connection with FIG. 7C may represent the degree of misalignment between the transmitter coil 414 and the receiver coil 418 of FIG. 5 embedded in the transmitter pad 702 and the receiver pad 704 respectively.

Figure 7C:
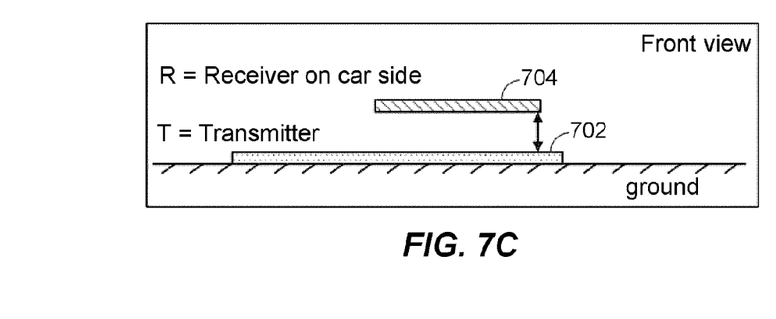
FIG. 7C is another exemplary illustration of vehicle misalignment measurement according to one implementation.

FIG. 7C is another exemplary illustration of vehicle misalignment measurement according to one implementation. The exemplary illustration is a front view of the case in which the receiver pad 704 is misaligned with respect to the transmitter pad 702 as illustrated in FIG. 7B. In addition to the longitudinal and lateral misalignment values, the vertical gap value can be calculated by determining the vertical distance between the transmitter pad 702 and the receiver pad 704. A misalignment parameter can be expressed in a three-dimensional Cartesian coordinate (x, y, z), representing longitudinal, lateral, and vertical gap according to this implementation. In another implementation, the misalignment parameters can be calculated with respect to points other than the center coordinates of the transmitter pad 702 and the receiver pad 704. In another implementation, the vehicle misalignment may be expressed in non-Cartesian coordinates, including variables such as angle or radial distance. In another implementation, the vehicle misalignment may also be expressed in variables other than translational misalignment such as rotational parameters including roll, yaw, and pitch.

Figure 8A:
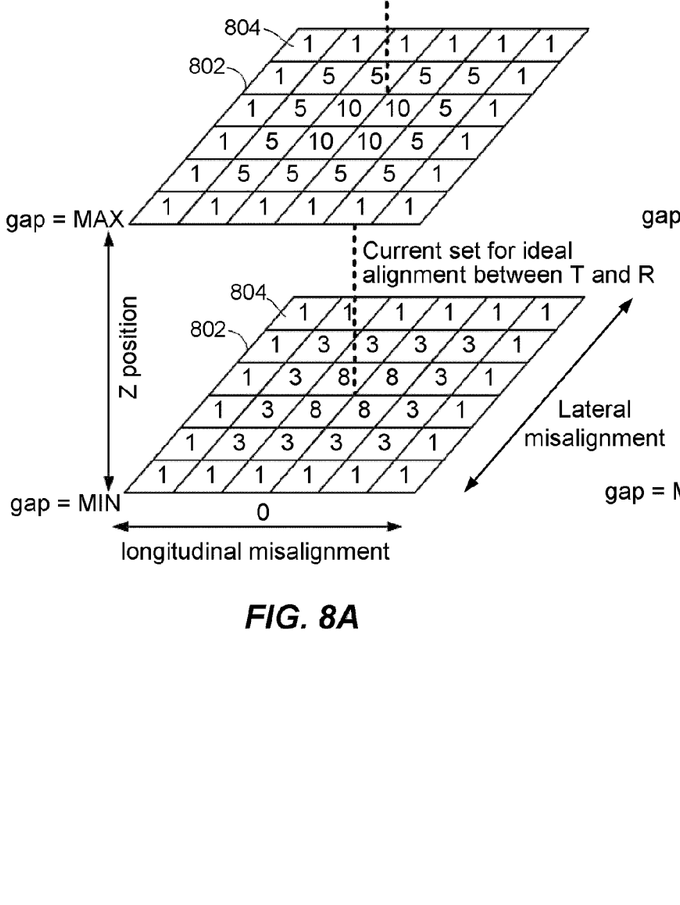
FIG. 8A is an exemplary illustration of a current level look-up table in accordance with one implementation.

FIG. 8A is an exemplary illustration of a current level lookup table in accordance with one implementation. The illustration depicts a three-dimensional lookup table, including one or more stored value layers 802 and stored values 804. The illustrated implementation also may include multiple stored value layers (not shown) in between the illustrated vertical gap store value layers 802. In the current implementation, longitudinal misalignments are on the x-axis, lateral misalignments on the y-axis, and vertical gap on the z-axis, and one stored value layer 802 includes one or more stored values 804 for one given z value, or vertical gap in this implementation. Longitudinal misalignment on the x-axis can be positive or negative depending on the direction of the misalignment, and lateral misalignment on the y-axis can also be positive or negative depending on the direction of the misalignment in one implementation. The vertical gap on the z-axis may range from zero to a positive number depending on the vertical distance between the transmitter pad 702 of FIG. 7C and the receiver pad 704 of FIG. 7C. In another implementation, a lookup table may include the stored values 804 for given translational parameters or non-translational parameters in a non-Cartesian coordinate.

In one implementation, the stored value 804 for a discrete coordinate in (x, y, z) may represent maximum current level value allowed in compliance with emissions regulations for a given misalignment in (x, y, z). As described below, the current level value for a given misalignment (x, y, z) may depend on a vehicle type or other vehicle characteristic. Stated another way, different lookup tables for current values for various alignments are provided for different vehicle types/characteristics. In another implementation, the stored value 804 for a given (x, y, z) may represent maximum power level value allowed in compliance with emissions regulations. In yet another implementation, the stored value 804 may represent an input parameter for the controller circuit 609 of FIG. 6 that controls the current and/or power level of the transmitter pad 702 of FIG. 7. For example, the vehicle 401 (FIG. 5) may be parked at the charging station as described in connection with FIG. 7B with a misalignment parameter of (2, 1, MAX), which represents the longitudinal misalignment of 2, lateral misalignment of 1, and the vertical gap of MAX. According to the exemplary lookup table illustrated in FIG. 8A, the maximum regulation-compliant current level factor may be 5. While disclosures herein may describe implementations using levels of current, other electrical characteristics such as measures of voltage or power may be used in addition to or instead of levels of current in accordance with the principles described herein.

Figure 8B:
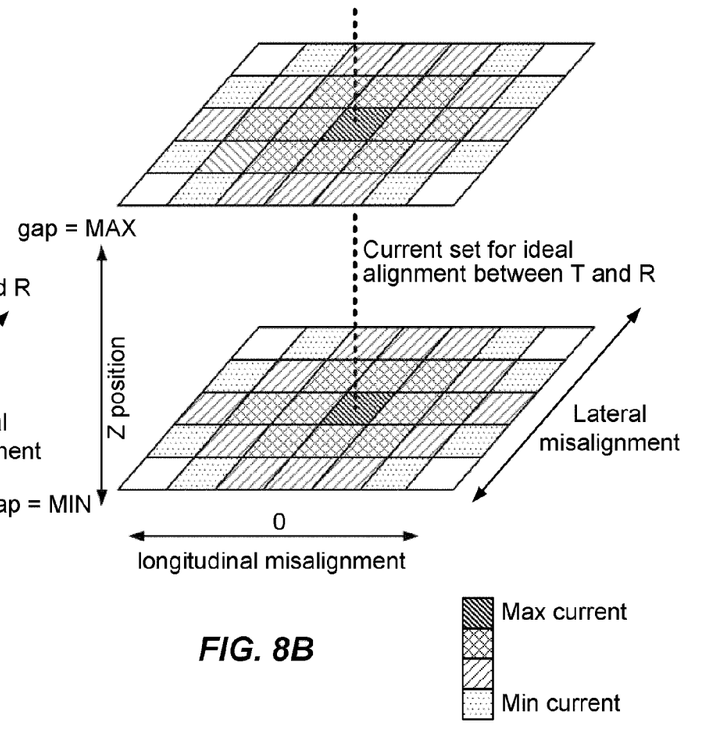
FIG. 8B is another exemplary illustration of a current level look-up table in accordance with one implementation.

FIG. 8B is another exemplary illustration of a current level lookup table in accordance with one implementation. FIG. 8B illustrates maximum current level values for various misalignment parameters in (x, y, z) in grayscale, in which a higher stored value 804 of FIG. 8A is represented in darker shades compared to a lower stored value 804 of FIG. 8A.

The maximum current level values may be determined through simulation, measurements in a controlled environment, or a combination of both. The maximum current level values for the look-up table may be generated from measured magnetic field values around a vehicle parked at a charging station. Furthermore, various charging conditions, such as altering the surrounding temperature, can be created during the measurement process. For example, the vehicle can be positioned with a certain misalignment. Then, incrementally increasing level of current may be applied to the transmitter pad 702 (FIG. 7), and the magnetic field emission around the car for each level of current can be measured. Once the magnetic field emission has reached the maximum allowable level under applicable regulations, the maximum level of current for the given misalignment can be stored as the stored value 804 (FIG. 8A) for the given misalignment in (x, y, z), for example. In another example, the maximum power level instead of the current level of the transmitter pad 702 (FIG. 7) may be determined and stored for certain misalignment parameters and temperature. In another example, the current and/or power level may be analytically derived from the measured magnetic field around the vehicle at a given misaligned position.

Part or all of the measurement process can also involve computer simulations and other analytical tools. Through the simulation and measurement process, phenomena that are irregular, nonlinear, not readily apparent, or cannot be derived can be reflected in the resulting database. For example, FIGS. 8A and 8B illustrate that the maximum allowable current level is greater as the vertical distance between the transmitter pad 702 (FIG. 7C) and the receiver pad 704 (FIG. 7C) increases as, for example, the stored value 804 (FIG. 8A) at (0, 0, MAX) is greater than the stored value 804 (FIG. 8A) at (0, 0, 0). These illustrations demonstrate how emissions for the same current level for a vehicle in the same position under the same surrounding conditions may be greater as the vertical z distance between the transmitter pad 702 (FIG. 7C) and the receiver pad 704 (FIG. 7C) gets smaller.

Once determined, the maximum current level values may be stored, for example, in the database 630 of FIG. 6 for a given range of discrete misalignment parameters and the type of vehicle. In another implementation, the maximum power level values may be stored for given a given range of misalignment parameters and the type of vehicle. Depending on charging conditions that affect the maximum values of allowable current or power level, more than one lookup table may be generated and stored for the range of discrete misalignment parameters. For example, a maximum power level may depend on the surrounding temperature of the charging station, and more than one lookup table of maximum power values may be generated and stored for different temperatures. The exemplary measurement process described above may be repeated for different surrounding conditions, such as different temperatures, one or more nearby charging stations, or any other conditions that may affect the maximum allowable current or power level. Lookup tables generated from the measurement process under different conditions may also be stored in a database such as the database 630 of FIG. 6.

Figure 9:
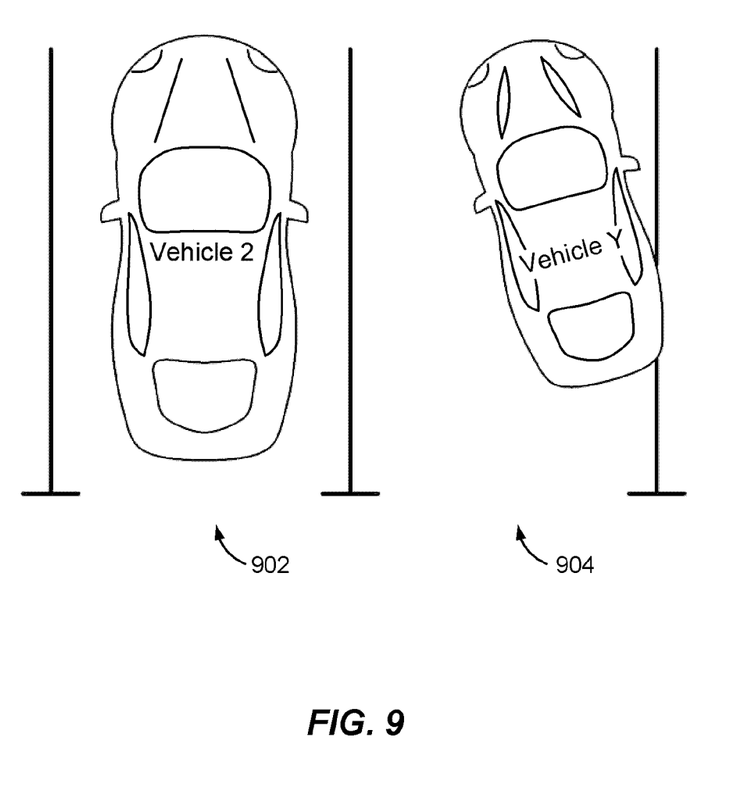
FIG. 9 is an exemplary illustration of vehicles of different types under different charging conditions.

FIG. 9 is an exemplary illustration of vehicles of different types in different charging conditions. FIG. 9 illustrates a first parking spot 902 for Vehicle 2 (shown on the left) and a second parking spot 904 for Vehicle Y (shown on the right). Vehicle 2 and Vehicle Y are substantially similar to the vehicle 401 of FIG. 4. The first parking spot 902 is in parallel with the second parking spot 904, and each parking spot may incorporate or be part of a charging system comprising a transmitter 604 (not shown) of FIG. 6 including a transmitter pad (not shown) substantially similar to the transmitter pad 702 of FIGS. 7A-7C. Each of Vehicle 2 and Vehicle Y may include a receiver pad (not shown) substantially similar to the receiver pad 704 of FIGS. 7A-7C.

As illustrated in FIG. 9, Vehicle 2 is of a different type from Vehicle Y, in that Vehicle 2 may be bigger and have different outer shape. Furthermore, the charging conditions of Vehicle 2 and Vehicle Y are different. Vehicle 2 is aligned with the first parking spot 902 and has the nearby charging system of the second parking spot 904 to its right. On the other hand, Vehicle Y is misaligned with respect to the second parking spot 904 and has the nearby charging system of the first parking spot 902 to its left. There may also be further difference in charging conditions, such as having another one or more nearby charging system (not shown) being closer to one of the vehicles than the other, for example.

Once, for example, Vehicle 2 is parked at the first parking spot 902, the sensor circuit 627 (FIG. 6) of the charging station of the first parking spot 902 may make measurements with respect to these various charging conditions described above with reference to FIGS. 8A-8B. Similarly, once Vehicle Y is parked at the second parking spot 904, the sensor circuit 627 (FIG. 6) of the charging station of the second parking spot 904 may make similar measurements. If the misalignment measurements are too great to be within the range of stored misalignment parameters as represented in FIGS. 8A-8B, for example, the charging station may communicate with the vehicle 401 (FIG. 5) through its communication circuit 628 (FIG. 6) to advise re-parking of the vehicle 401 (FIG. 4). If the vehicle 401 (FIG. 5) is somewhat misaligned with its parking spot yet still within the stored data range as in Vehicle Y at the second parking spot 904 in FIG. 9, the charging system of the second parking spot 904 may begin its adaptive charging process considering misalignment, charging conditions, and applicable regulations. The adaptive charging process is further discussed below with reference to FIG. 10.

Figure 10:
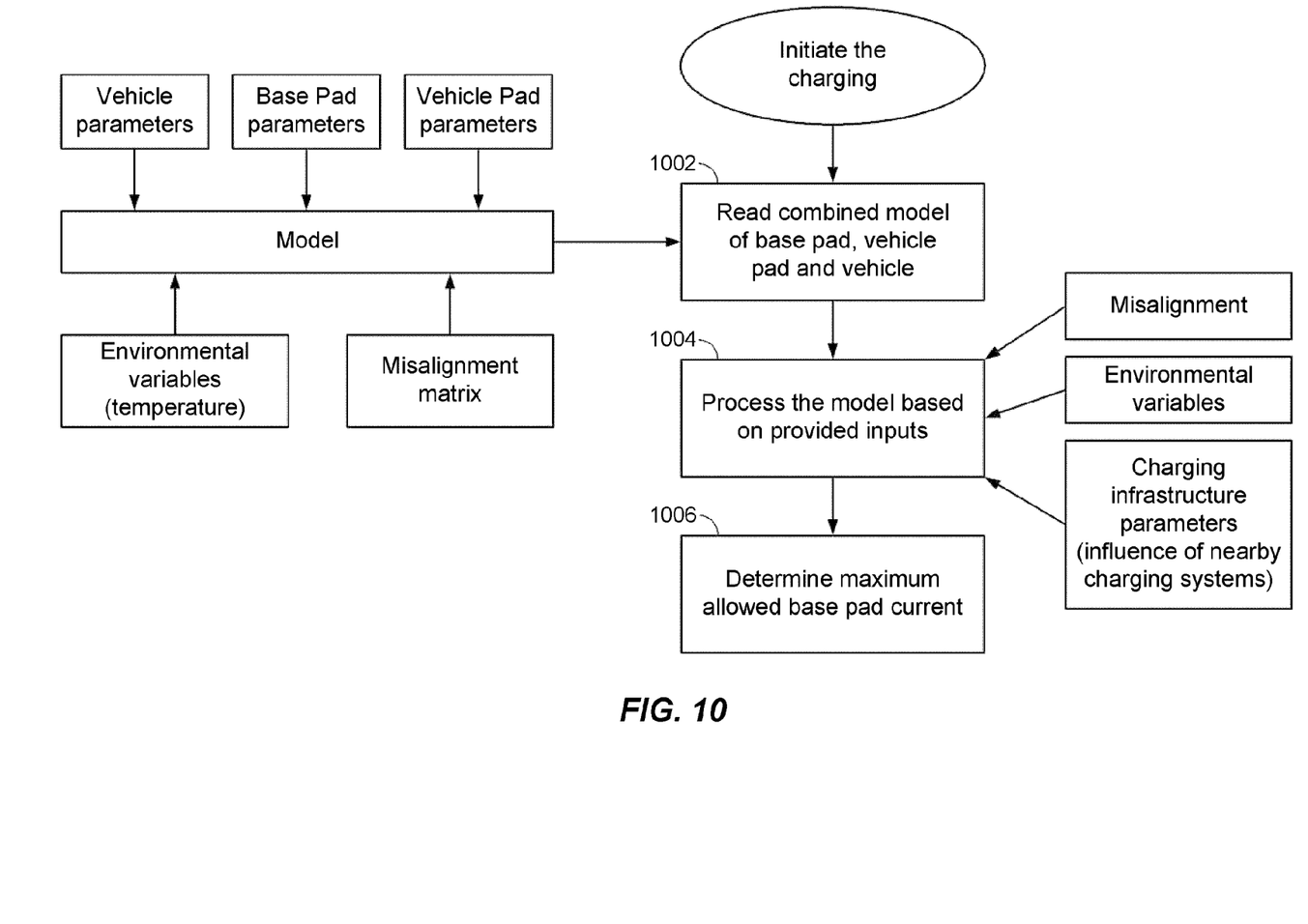
FIG. 10 illustrates a flowchart of a method for adaptive charging compliance control in accordance with one implementation.

FIG. 10 illustrates a flowchart of a method for adaptive charging compliance control. The method shown in FIG. 10 may be implemented via one or more devices in a controller substantially similar to the controller circuit 629 of a charging system including the base pad 415 and the transmitter 404 of FIG. 5. The method shown in FIG. 10 may be performed in conjunction with a local or remote database, substantially similar to the database 630 of FIG. 6. In one implementation, once the vehicle 401 (FIG. 5) approaches the charging system, the controller may initiate communication with the vehicle 401 (FIG. 5) through the communication channel 619 (FIG. 6), for example, to obtain information regarding the receiver 408 (FIG. 5), vehicle pad, and vehicle parameter such as size and type. In another implementation, the controller may further communicate directional information to the vehicle driver so that the vehicle 401 (FIG. 5) can be parked or re-parked within a region where wireless charging is effective. Once the vehicle 401 (FIG. 5) is parked at a parking spot, such as the first and second parking spots 902 and 904, within the effective wireless charging region, the charging process can be initiated, and the controller proceeds to block 1002.

At block 1002, the controller accesses a combined maximum allowable current or power model based on the obtained vehicle pad and vehicle parameter information and base pad information. The combined model may be represented in a manner similar to the lookup table discussed with reference to FIGS. 8A-8B and may also include processing parameters or algorithms for environmental variables and misalignments to provide a proximate model for a given charging condition. Processing parameters or algorithms may include types of interpolation or superposition of stored data such as the stored value 804 (FIG. 8A). The controller may select one or more datasets that are closest to the current charging condition. Once the combined model is accessed and one or more relevant datasets are selected, the controller proceeds to block 1004.

At block 1004, the controller processes the combined model based on the charging condition inputs it receives through, for example, the sensor circuit 627 of FIG. 6. Such charging condition inputs may include misalignment parameter, environmental variables, such as temperature, and charging infrastructure parameters, such as nearby charging systems. Based on the charging condition inputs, the combined model can be further processed through, for example, interpolation or superposition to generate a temporality extrapolated model for the particular charging condition of the parked vehicle. Once the combined model is processed, the controller proceeds to block 1006.

At block 1006, the controller determines the maximum allowable current level in compliance with emissions regulations according to the combined and/or processed model from block 1004. If, for example, the maximum current level value for a particular misalignment parameters expressed in (x, y, z) is not stored in a lookup table substantially similar to the illustration of FIG. 8A, then the maximum current level for that misalignment parameter may be calculated through interpolation of multiple stored values 804 (FIG. 8A) surrounding the given (x, y, z) coordinate. Similarly, if the maximum power level for a certain temperature is not stored in the database 630 (FIG. 6), the maximum power level for that temperature can be interpolated from stored power level values for different temperature values. In another example, the maximum current level may be determined through superposition of two or more lookup table models substantially similar to the one depicted in FIG. 8A to reflect the influence of surrounding infrastructure, such as nearby charging systems. Once the maximum allowable current level is determined, the controller may apply the current level and start charging the vehicle 401 (FIG. 5).

Figure 11:
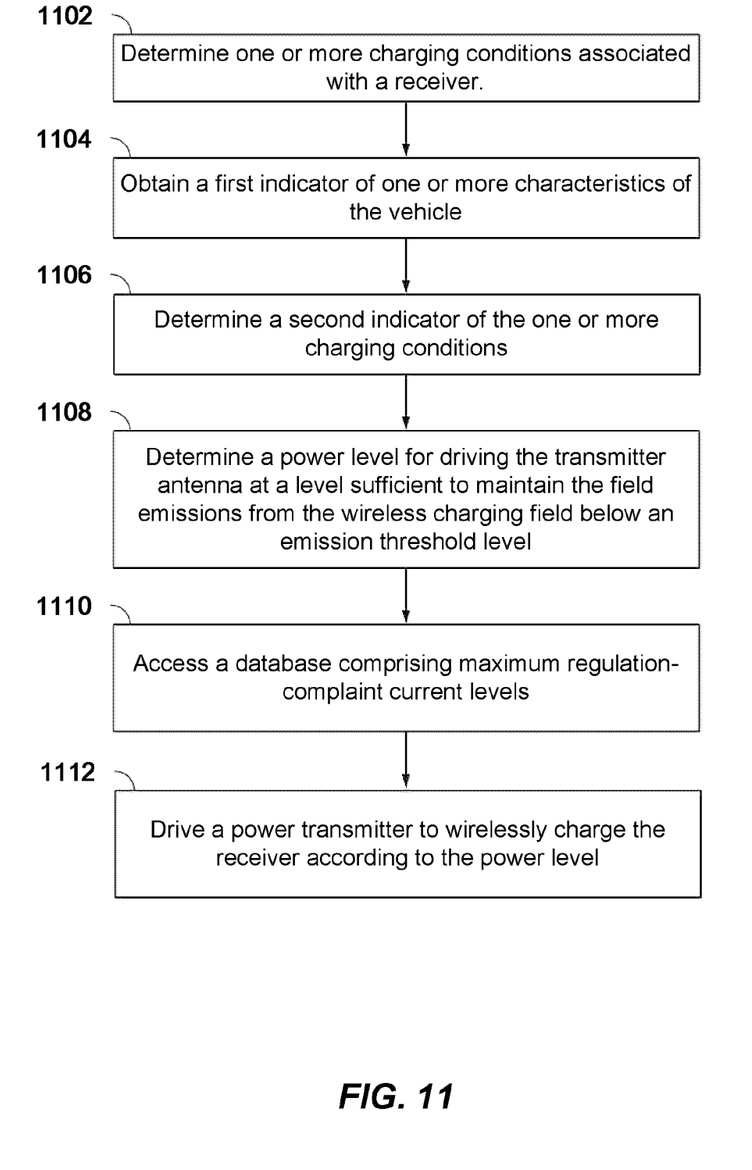
FIG. 11 illustrates a flowchart of a method for adaptive charging compliance control in accordance with another implementation.

FIG. 11 illustrates a flowchart of a method for adaptive charging compliance control in accordance with another implementation. At block 1102, one or more charging conditions associated with the receiver are determined. At block 1104, a first indicator of one or more characteristics of the vehicle is obtained. At block 1106, a second indicator of the one or more charging conditions is determined. At block 1108, a power level for driving the transmitter antenna at a level sufficient to maintain the field emissions from the wireless charging field below an emission threshold level is determined. The power level is determined based on the first and second indicators. At block 1110, a database comprising maximum regulation-compliant current levels are accessed. At block 1112, a power transmitter is driven to wirelessly charge the receiver according to the power level.

As such, in accordance with implementations described herein, a wireless power transfer system determines a maximum power limit that is sufficient to maintain field emissions below an emission threshold level based on a dynamic charging value that changes based on the condition during charging. The maximum power limit is derived from the dynamic charging value and one or more stored emission limit data based on characteristics of the vehicle as described above.

In accordance with the implementations described herein, a means for determining one or more charging conditions associated with the receiver, a means for obtaining a first indicator of one or more characteristics of the vehicle, a means for determining a second indicator of the one or more charging conditions, and a means for determining a power level for driving a transmitter antenna at a level sufficient to maintain the field emissions from the wireless charging field below an emission threshold level, the power level determined based on the first and second indicators, may comprise a controller operationally coupled to a sensor circuit. Also in accordance with the implementations described herein, a means for transmitting may comprise a coil.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, nontransitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features have been described herein. It is to be understood that not necessarily all such advantages may be achieved in accordance with any particular implementation. Thus, the disclosed techniques may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. An apparatus for transmitting charging power wirelessly to a receiver via a wireless charging field generating field emissions, the receiver having a receiver antenna and operationally connected to a load of a vehicle, the apparatus comprising:
   a power transmitter having a transmitter antenna;
   a sensor circuit configured to determine one or more charging conditions associated with the receiver;
   a controller operationally coupled to the sensor circuit and configured to:
      obtain a first indicator of one or more characteristics of the vehicle;
      determine a second indicator of the one or more charging conditions; and
      determine a power level for driving the transmitter antenna at a level sufficient to maintain the field emissions from the wireless charging field below an emission threshold level, the power level determined based on the first and second indicators; and
   a driver circuit configured to drive the power transmitter to wirelessly charge the receiver according to the power level.

2. The apparatus of claim 1, wherein the controller is further configured to access a database, the database comprising maximum regulation-compliant current levels generated through a plurality of simulations conducted for a plurality of preselected vehicles and under predetermined charging conditions.

3. The apparatus of claim 1, wherein the one or more charging conditions comprise a relative alignment between the receiver antenna and the transmitter antenna.

4. The apparatus of claim 3, wherein the relative alignment represents translational difference between a reference point of the receiver antenna and a reference point of the transmitter antenna.

5. The apparatus of claim 3, wherein the controller is further configured to access a database comprising a plurality of lookup tables, each of the plurality of lookup tables comprising a plurality of values, each of which corresponding to a maximum current level for a predetermined relative alignment between the receiver antenna and the transmitter antenna.

6. The apparatus of claim 5, wherein the controller determines the power level based on interpolating the plurality of values of the maximum current matrix based on the second indicator.

7. The apparatus of claim 1, wherein the one or more charging conditions comprise one or more of temperature surrounding the vehicle and infrastructure surrounding the power transmitter.

8. The apparatus of claim 1, wherein the field emissions comprise magnetic field emissions, and wherein the transmitter antenna comprises a coil having one or more windings configured to generate the wireless charging field.

9. An apparatus for transmitting charging power wirelessly to a receiver via a wireless charging field generating field emissions, the receiver having a receiver antenna and operationally connected to a load of a vehicle, the apparatus comprising:
a power transmitter having a transmitter antenna;
a sensor circuit configured to determine one or more charging conditions associated with the receiver; and
a controller operationally coupled to the sensor circuit and configured to:
obtain a first indicator of one or more characteristics of the vehicle;
determine a second indicator of the one or more charging conditions; and
determine a power level for driving the transmitter antenna at a level sufficient to maintain the field emissions from the wireless charging field below an emission threshold level, the power level determined based on the first and second indicators,
wherein the one or more characteristics of the vehicle comprise one or more of type of the vehicle, size of the vehicle, type of the receiver, and type of a battery coupled to the vehicle.

10. The apparatus of claim 9, wherein the controller is further configured to access a database of a plurality of lookup tables, each of the plurality of lookup tables comprises a plurality of values, each of which corresponding to a current level for the first indicator.

11. The apparatus of claim 9, wherein the one or more charging conditions comprise a relative alignment between the receiver antenna and the transmitter antenna.

12. The apparatus of claim 9, wherein the field emissions comprise magnetic field emissions, and wherein the transmitter antenna comprises a coil having one or more windings configured to generate the wireless charging field.

13. The apparatus of claim 9, wherein the controller is further configured to access a database comprising a plurality of lookup tables, each of the plurality of lookup tables comprising a plurality of values, each of which corresponding to a maximum current level for a predetermined relative alignment between the receiver antenna and the transmitter antenna.

14. A method for transmitting charging power wirelessly to a receiver via a wireless charging field generating field emissions, the receiver having a receiver antenna and operationally connected to a load of a vehicle, the method comprising:
determining one or more charging conditions associated with the receiver;
obtaining a first indicator of one or more characteristics of the vehicle;
determining a second indicator of the one or more charging conditions;
determining a power level for driving the transmitter antenna at a level sufficient to maintain the field emissions from the wireless charging field below an emission threshold level, the power level determined based on the first and second indicators; and
driving a power transmitter, having the transmitter antenna, to wirelessly charge the receiver according to the power level.

15. The method of claim 14 further comprising:
accessing a database, wherein the database comprises maximum regulation-compliant current levels generated through a plurality of simulations conducted for a plurality of preselected vehicles and under predetermined charging conditions.

16. The method of claim 14, wherein the one or more characteristics of the vehicle comprise one or more of type of the vehicle, size of the vehicle, type of the receiver, and type of a battery coupled to the vehicle.

17. The method of claim 14 further comprising:
accessing a database,
wherein the one or more charging conditions comprise a relative alignment between the receiver antenna and the transmitter antenna, and
wherein the database comprises a plurality of lookup tables, each of the plurality of lookup tables comprising a plurality of values, each of which corresponding to a current level for a predetermined relative alignment between the receiver antenna and the transmitter antenna.

18. The method of claim 17, wherein the power level is determined based on interpolating the plurality of values corresponding to current levels based on the second indicator.

19. The method of claim 14, wherein the one or more charging conditions comprise one or more temperature measurement surrounding the vehicle and infrastructure surrounding the power transmitter.

20. An apparatus for transmitting charging power wirelessly to a receiver via a wireless charging field generating field emissions, the receiver having a receiver antenna and operationally connected to a load of a vehicle, the apparatus comprising:
first means for determining one or more charging conditions associated with the receiver;
means for obtaining a first indicator of one or more characteristics of the vehicle;
second means for determining a second indicator of the one or more charging conditions;
third means for determining a power level for driving a transmitter antenna at a level sufficient to maintain the field emissions from the wireless charging field below an emission threshold level, the power level determined based on the first and second indicators; and means for driving the transmitter antenna according to the power level.

21. The apparatus of claim 20, wherein the first determining means, the obtaining means, the second determining means, and the third determining means comprise a controller, and the driving means comprises a driver circuit.

22. The apparatus of claim 20, wherein the one or more characteristics of the vehicle comprise one or more of type of the vehicle, size of the vehicle, type of the receiver, and type of a battery coupled to the vehicle, and the one or more charging conditions comprise one or more of temperature surrounding the vehicle and infrastructure surrounding the power transmitter.

* * * * *